US010018209B2

(12) United States Patent
Burd et al.

(10) Patent No.: US 10,018,209 B2
(45) Date of Patent: *Jul. 10, 2018

(54) INSERT AND METHOD FOR ANCHORING IN A CORED PANEL

(71) Applicant: B/E Aerospace, Inc., Wellington, FL (US)

(72) Inventors: Peter John Leslie Burd, Carmarthenshire (GB); Venkata Prasanth Suman Neti, Stevenage (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,552

(22) Filed: Apr. 1, 2015

(65) Prior Publication Data

US 2015/0204362 A1 Jul. 23, 2015

Related U.S. Application Data

(63) Continuation of application No. 14/168,718, filed on Jan. 30, 2014, now Pat. No. 9,003,662.

(Continued)

(51) Int. Cl.
*F16B 5/02* (2006.01)
*F16B 5/01* (2006.01)
(Continued)

(52) U.S. Cl.
CPC .................. *F16B 5/02* (2013.01); *F16B 5/01* (2013.01); *F16B 33/00* (2013.01); *F16B 37/048* (2013.01);
(Continued)

(58) Field of Classification Search
CPC .......... F16B 5/02; F16B 33/00; F16B 37/048; F16B 5/01; F16B 11/006; Y10T 29/49622; Y10T 29/4981; Y10T 29/49948
See application file for complete search history.

(56) References Cited

U.S. PATENT DOCUMENTS 3,252,493 A 5/1966 Smith
3,282,015 A 11/1966 Rohe et al.
(Continued)

FOREIGN PATENT DOCUMENTS

CN 1141667 A 1/1997
CN 1924376 A 3/2007
(Continued)

OTHER PUBLICATIONS

Chinese Search Report, Mar. 10, 2016, 1 page, from App. No. 2014800061338.
(Continued)

*Primary Examiner* — John C Hong
(74) *Attorney, Agent, or Firm* — Donna P. Suchy

(57) ABSTRACT

In an illustrative embodiment, an insert apparatus for creating an attachment point in an aircraft panel includes a flange insert configured for bonding against an inner surface of a skin of the aircraft panel such that a portion of a load from a component mounted to the attachment point is distributed through the skin. The flange insert may include a wide flange, a bore, and a central opening through the wide flange and the bore, and a nut including an enlarged end and a shaft, where the nut is disposed in the central opening of the flange such that the enlarged end is proximate the wide flange and the shaft extends along the bore. Upon bonding to the aircraft panel, the bore may extend from an underside of the wide flange to proximate an outer surface of the skin of the aircraft panel.

18 Claims, 4 Drawing Sheets

Related U.S. Application Data

(60) Provisional application No. 61/758,910, filed on Jan. 31, 2013.

(51) Int. Cl.
*F16B 37/04* (2006.01)
*F16B 33/00* (2006.01)
*F16B 11/00* (2006.01)

(52) U.S. Cl.
CPC .......... *F16B 11/006* (2013.01); *Y10T 29/4981* (2015.01); *Y10T 29/49622* (2015.01); *Y10T 29/49948* (2015.01)

(56) References Cited

U.S. PATENT DOCUMENTS

| | | |
|---|---|---|
| 3,313,079 A | 4/1967 | Phelan |
| 3,339,609 A | 9/1967 | Cushman |
| 3,504,723 A | 4/1970 | Cushman et al. |
| 3,646,981 A | 3/1972 | Barnes |
| 3,771,272 A | 11/1973 | Mihaly et al. |
| 3,778,957 A | 12/1973 | Appleberry |
| 4,717,301 A | 1/1988 | Oddenino |
| 4,800,643 A | 1/1989 | Higgins |
| 4,812,193 A | 3/1989 | Gauron |
| 4,817,264 A | 4/1989 | Worthing |
| 4,941,785 A | 7/1990 | Witten |
| 4,964,594 A | 10/1990 | Webb |
| 4,973,208 A | 11/1990 | Gauron |
| 4,981,735 A | 1/1991 | Rickson |
| 5,082,405 A | 1/1992 | Witten |
| 5,093,957 A | 3/1992 | Do |
| 5,240,543 A | 8/1993 | Fetterhoff |
| 5,378,099 A | 1/1995 | Gauron et al. |
| 5,415,510 A | 5/1995 | Funaki et al. |
| 5,542,777 A | 8/1996 | Johnson |
| 5,632,582 A | 5/1997 | Gauron et al. |
| 5,713,706 A | 2/1998 | Lozano |
| 5,716,112 A | 2/1998 | Staszak |
| 5,759,002 A | 6/1998 | Essenberg |
| 6,135,687 A | 10/2000 | Leek et al. |
| 6,264,412 B1 | 7/2001 | Nakamura et al. |
| 6,298,633 B1 | 10/2001 | McCorkle et al. |
| 6,488,460 B1 * | 12/2002 | Smith ................ F16B 5/01 411/339 |
| 6,862,863 B2 | 3/2005 | McCorkle et al. |
| 7,195,436 B1 * | 3/2007 | Stephen .............. F16B 5/01 411/373 |
| 7,428,802 B2 | 9/2008 | Fukura et al. |
| 8,136,328 B2 | 3/2012 | Erickson et al. |
| 8,393,601 B2 | 3/2013 | de Mola |
| 8,409,395 B2 | 4/2013 | Schumacher, Jr. et al. |
| 8,986,491 B2 * | 3/2015 | Schumacher, Jr. ....... B64C 1/14 156/293 |
| 9,422,968 B2 | 8/2016 | Thompson |
| 2006/0137294 A1 | 6/2006 | Waits Jr. |
| 2007/0048106 A1 | 3/2007 | Christ et al. |
| 2009/0293421 A1 | 12/2009 | Erickson et al. |
| 2010/0086377 A1 | 4/2010 | de Mola |
| 2013/0223953 A1 | 8/2013 | Thompson |
| 2014/0096363 A1 | 4/2014 | Khamithar et al. |

FOREIGN PATENT DOCUMENTS

| | | |
|---|---|---|
| DE | 19645467 A1 | 5/1998 |
| DE | 102005041350 A1 | 3/2007 |
| EP | 0746693 A1 | 12/1996 |
| EP | 780581 A1 | 9/1999 |
| EP | 841490 A2 | 10/2001 |
| EP | 1441084 A1 | 7/2004 |
| FI | 934243 A | 3/1994 |
| GB | 1353236 A | 5/1974 |
| JP | 2008051224 A | 3/2008 |
| JP | 4220606 B2 | 2/2009 |
| JP | 2009079666 A | 4/2009 |
| JP | 2009197966 A | 9/2009 |
| JP | 2012171568 A | 9/2012 |
| JP | 2016512589 A | 4/2016 |

OTHER PUBLICATIONS

International Search Report and Written Opinion dated Jun. 3, 2014 for PCT/US2014/014216.
International Preliminary Report on Patentability dated Aug. 4, 2015 for PCT/US2014/014216.

* cited by examiner

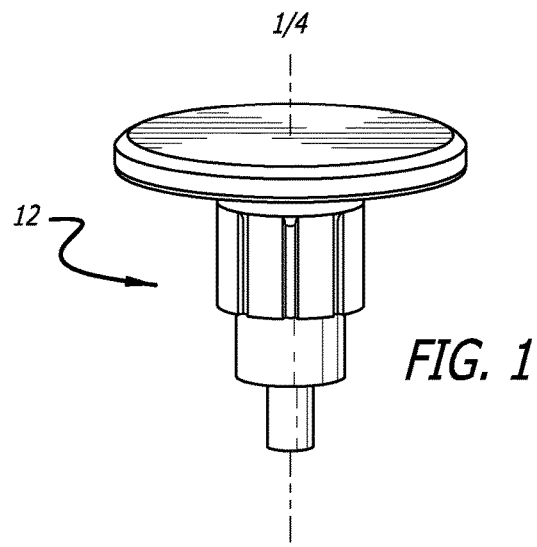
FIG. 1
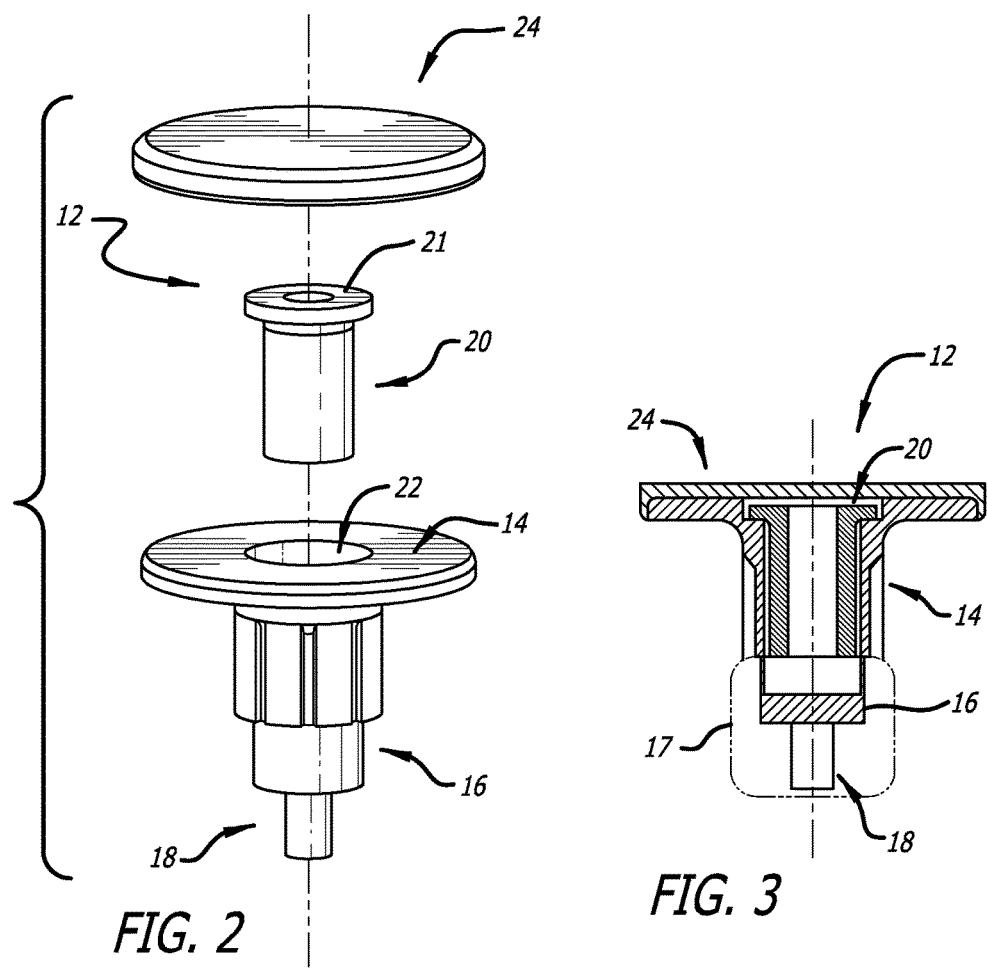
FIG. 2
FIG. 3

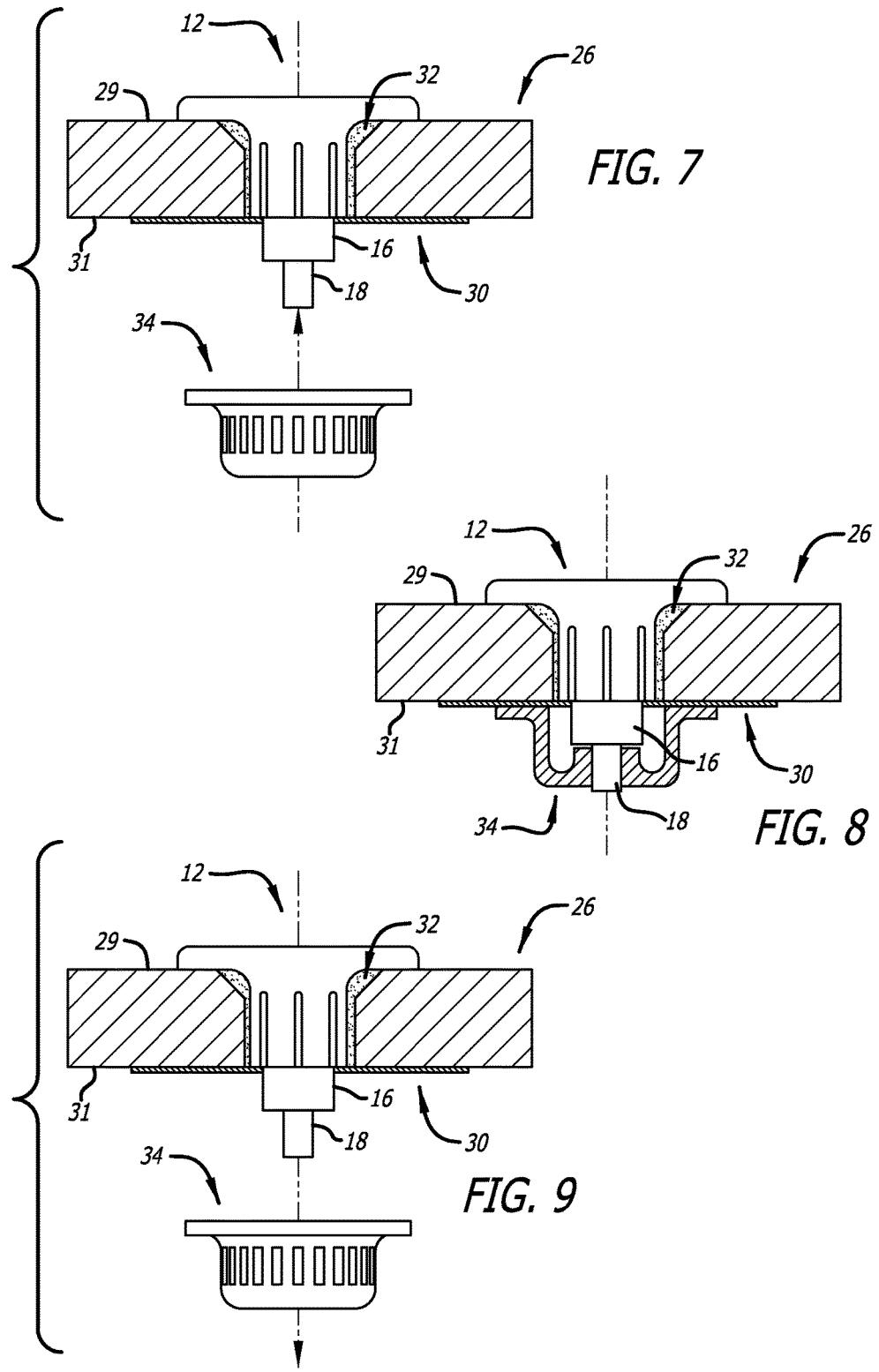

INSERT AND METHOD FOR ANCHORING IN A CORED PANEL

CROSS-REFERENCES TO RELATED APPLICATIONS

This application is a continuation based on U.S. Ser. No. 14/168,718, filed on Jan. 30, 2014, which claims priority from U.S. Provisional Application No. 61/758,910, filed Jan. 31, 2013, which are incorporated by reference in their entirety herein.

FIELD OF THE INVENTION

The invention generally relates to inserts which are anchored in a cored sandwich or composite panel to enable the attachment of various components to the panel. More particularly, the invention provides an improved insert configuration and anchoring method which provides for a more secure attachment and significantly reduces installation time.

BACKGROUND OF THE INVENTION

A variety of structures are provided for storage, entertainment, food service, rest and crew and passenger comfort within the fuselage of a typical commercial passenger carrying aircraft. These structures or "monuments" are constructed of honeycomb cored sandwich or composite panel manufactured from fiberglass skins and a Nomex or Kevlar paper core, or aluminum in most modern aircraft.

In order to provide a means of attaching such items as components, service sub-assemblies or secondary modules to the monument, fixing points are bonded into the structural panel at specific locations as required, these fixing points are commonly known as "inserts". Inserts have heretofore been bonded in sandwich or composite panels by creating wide cavities in the core using hand tools and filling such cavities with adhesive material, which upon curing forms a bond between the insert and the surrounding core and skins. Such cavities are larger in diameter than the diameter of the insert and spread the load over a wider area to provide a greater load carrying capacity than the panel would otherwise be capable of.

An improved insert configuration and attachment method is desirable in order to eliminate the need for large bonding cavities in the panel core, to improve load distribution in the sandwich or composite panel, to reduce the adhesive requirement, to eliminate potential cold bridges, to provide a cleaner process and to significantly reduce manufacturing process times for the installation of the insert.

SUMMARY OF THE INVENTION

The wide flange insert (WFI) of the present invention overcomes shortcomings of previously known insert configurations and methods for anchoring such inserts in cored panels. More particularly, the wide flange insert is intended to eliminate the need for de-coring the panel in order to securely install the fixing point. The wide flange of the invention which rests on one face of the panel is designed to take the load thereby eliminating the need to make wide cavities in the core in which to inject the bonding adhesive around the insert. As a result, significant assembly bonding and curing time savings can be realized, together with reductions in weight and the elimination of a potential cold bridge in a chilled compartment of a refrigerated galley due to the elimination of the adhesive plug surrounding the insert. A new manufacturing process for attaching the insert to the panel comprises an aspect of the invention and uses a cap screw tool to retain the wide flange insert in position during bonding to thereby further reduce the manufacturing process time.

The wide flange insert consists of a metallic or non-metallic bobbin with one surface enlarged to form a rim (the flange) that rests on the surface of the skin on the opposite side of the panel to which the component or sub assembly is to be attached (i.e. the loaded side). Prior to installing the insert a "blind" hole is bored from the reverse skin of the panel to the depth of the opposite skin inner face, using a router or hole saw (the mounting skin). No core is removed from the internal area surrounding the hole, just from the hole itself.

The router or hole saw may have a pilot drill at its center that pierces the mounting skin to accommodate a threaded pin and snap-off spigot or sacrificial cover at the non-flange end of the wide flange insert which allows the attachment of a bonding jig and prevents adhesive from contaminating the threaded metallic nut that is contained within the insert during the bonding process. To bond the wide flange insert to the panel liquid or paste thermosetting adhesive can be used to coat the nose, body and underside of the flange of the insert and/or the hole and surrounding skin on the side on which the flange will rest, the wide flange insert is then inserted into the hole. Alternatively a heat activated or contact adhesive may be used.

The force exerted by the threaded nut is distributed through the rear of wide flange insert, the nut having a spherical or flanged end larger than the through hole of the insert body which allows a degree of "float" to accommodate cases of minor misalignment. Stress loads are partly transferred from the wide flange insert to the skin on which the flange rests, through the adhesive in the routed hole to the core and also to the second skin through contact with the nose.

Accordingly, the present invention provides for a wide flange insert for providing an attachment point for attaching and anchoring a component to a panel. The wide flange insert includes a tubular wide flange body having a tubular shaft portion having a first outer diameter, an inner bore with an inner diameter, first and second ends, an enlarged flange formed at the first end of the tubular wide flange body and having a second outer diameter larger than the first diameter, and a counter bore formed at the first end of the inner bore of the tubular wide flange body. A first end of a generally cylindrical sacrificial cover is connected to the second end of the tubular wide flange body, and a threaded pin is connected to and extends from the second end of the sacrificial cover. A tubular nut is also disposed within the tubular wide flange body, and includes a tubular shaft portion having an outer diameter smaller than the inner diameter of the tubular wide flange body, and an enlarged flange formed at an end of the tubular nut. The tubular nut is disposed within the tubular wide flange body with the enlarged flange of the tubular nut disposed in the counter bore formed at the first end of the inner bore of the tubular wide flange body. A retainer cap configured to retain the tubular nut within the inner bore of the tubular wide flange body is also fixedly attached over the enlarged flange formed at the first end of the tubular wide flange body.

In a presently preferred aspect, the sacrificial cover is integrated into the wide flange insert body. In another presently preferred aspect, the sacrificial cover includes frangible sidewalls. In another presently preferred aspect, the tubular nut may be a floating nut or a non-floating nut.

The present invention also provides for a method of anchoring a wide flange insert in a panel having first and second sides for providing an attachment point for attaching and anchoring a component to the panel. The method includes the steps of drilling a countersunk pilot hole into a first side of the panel, placing a protective sheet over the countersunk hole on an opposing second side of the panel, and filling the countersunk hole with adhesive material. The wide flange insert is pushed into the adhesive filled countersunk hole sufficiently to cause the threaded pin and sacrificial cover to pierce the protective sheet and to cause the insert flange to contact the first side of the panel, an internally threaded fixture is fastened to the threaded pin to secure the wide flange insert in position, and then the adhesive is allowed to cure. The internally threaded fixture is then removed from the threaded pin, and the sacrificial cover and threaded pin are removed from the tubular wide flange body.

In a presently preferred aspect, the panel is a composite panel. In another presently preferred aspect, the sacrificial cover is integrated into the wide flange insert body. In another presently preferred aspect, the step of filling the countersunk hole with adhesive material further includes coating an underside of the flange with adhesive material.

In another presently preferred aspect, the threaded pin is covered with a removable protective sleeve having a piercing point to protect the threaded pin during the step of pushing the wide flange insert into the adhesive filled countersunk hole, and to prevent adhesive contamination of the thread during the step of pushing the wide flange insert into the adhesive filled countersunk hole. In another presently preferred aspect, the protective sleeve on the threaded pin is removed following the step of pushing the wide flange insert into the adhesive filled countersunk hole.

In another presently preferred aspect, the step of removing the sacrificial cover and threaded pin involves breaking off the sacrificial cover and threaded pin, or cutting off the sacrificial cover and threaded pin. In another presently preferred aspect, any residue of adhesive material on the second side of the panel from the second side of the panel is removed following the step of removing the sacrificial cover and threaded pin from the tubular wide flange body. In another presently preferred aspect, any sharp edges resulting from breaking off or cutting off the sacrificial cover and threaded pin are removed.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 1 is a perspective view of the wide flange insert of the present invention.

FIG. 2 is an exploded perspective view of the wide flange insert shown in FIG. 1.

FIG. 3 is a cross-sectional side view of the wide flange insert shown in FIG. 1.

FIG. 7 is a cross-sectional side view of the wide flange insert in place within the prepared cored panel prior to the curing step.

FIG. 8 is a cross-sectional side view of the wide flange insert in place within the prepared cored panel during the curing step.

FIG. 9 is a cross-sectional side view of the wide flange insert in place within the prepared cored panel after the curing step has been completed.

DETAILED DESCRIPTION OF THE PREFERRED EMBODIMENTS

Figure 4:
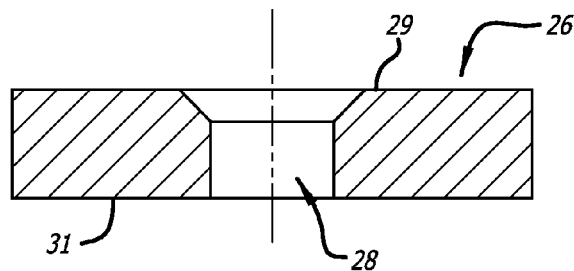
FIG. 4 is a cross-sectional side view of a cored panel in the process of being prepared for receipt of the wide flange insert.

The present invention provides for an improved insert configuration and a method of anchoring such in insert in a cored panel. The insert configuration includes features which facilitate its anchoring in an appropriately prepared panel and features to provide for an improved attachment point for items mounted to the panel via the insert.

The wide flange insert 12 (WFI) of the present invention is shown in a perspective view in FIG. 1, in a slightly enlarged exploded perspective view in FIG. 2 and in a fully assembled cross-sectional view in FIG. 3. The insert includes a wide flange body 14. A sacrificial cover 16 with an integral threaded pin 18 extending therefrom is initially attached to the wide flange body. A ball end or flanged floating or non-floating nut 20 is disposed inside the wide flange insert body with the wide end 21 of the ball end or flanged floating or non-floating nut located and supported in a counter bore hole 22 at the rear of the insert, the nut is retained within the wide flange insert body by a bonded or welded retainer cap 24 integrated into the insert flange itself. The retainer cap may extend across the full width of the flange as illustrated in FIGS. 1-3 or simply of a sufficient dimension to allow for insertion into the wide flange insert body from the rear. The insert may be injection molded from engineering grade plastics or machined from suitable metallic or non-metallic materials.

The sacrificial cover 16 is integrated into the wide flange insert body with a reduced cross sectional area (thin walls) as is visible in FIG. 3 to facilitate post processing removal so as to allow access to the threaded nut. The threaded pin 18 is an integral part of wide flange insert installation process and is used to secure the insert in position during curing using a screw cap tool as shown in FIG. 7.

Figure 5:
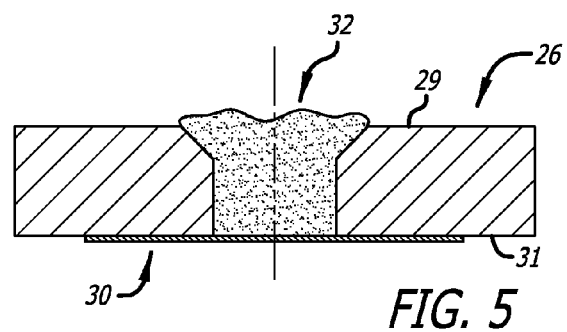
FIG. 5 is a cross-sectional side view of a cored panel further in the process of being prepared for receipt of the wide flange insert.

The present invention additionally provides for a method of installation or anchoring the insert in a composite or sandwich panel 26. A countersunk pilot hole 28 is drilled into a first surface or side 29 of a sandwich or composite panel as shown in FIG. 4. A protective sheet 30 is placed on the opposing second side, face sheet or load side 31 located on the opposing far side of the countersunk hole after which the countersunk hole is filled with adhesive material 32 as is shown in FIG. 5. The underside 33 of the flange may additionally be coated with adhesive.

Figure 6:
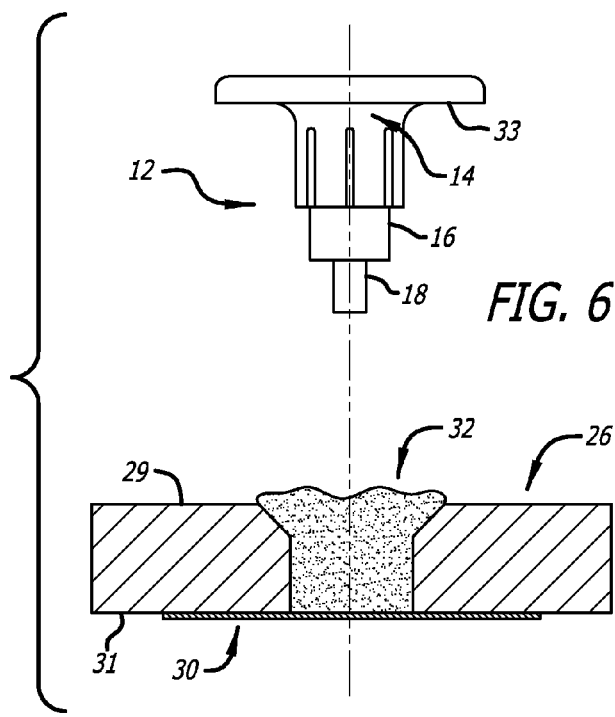
FIG. 6 is a cross-sectional side view of the wide flange insert being inserted into the prepared cored panel.

The subsequent step is shown in FIG. 6, wherein the wide flange insert 12 is pushed into the adhesive-filled or coated blind hole 28 causing the protective sheet 30 to be pierced by the threaded pin 18 and associated sacrificial cover 16 while the flange of the tubular wide flange body 14 comes to rest on the first or inner face 29 of the skin of the sandwich or composite panel 26. The threaded pin 18 is typically protected with a removable protective sleeve 17 (as shown in phantom line in FIG. 3) incorporating a piercing point (not shown) to prevent adhesive contamination of the thread of the threaded pin 18.

Once the wide flange insert 12 is in place in the countersunk hole 28 formed in the composite panel 26, the protective sleeve 17 around the threaded pin 18 is removed, and a screw fixture 34 is fastened to the threaded pin 18 (FIG. 7) to secure the wide flange insert 12 in position while the adhesive material 32 is allowed to cure (FIG. 8). After the adhesive material curing cycle is completed, the screw fixture 34 is unfastened (FIG. 9) and can be re-used for installing another wide flange insert.

Figure 10:
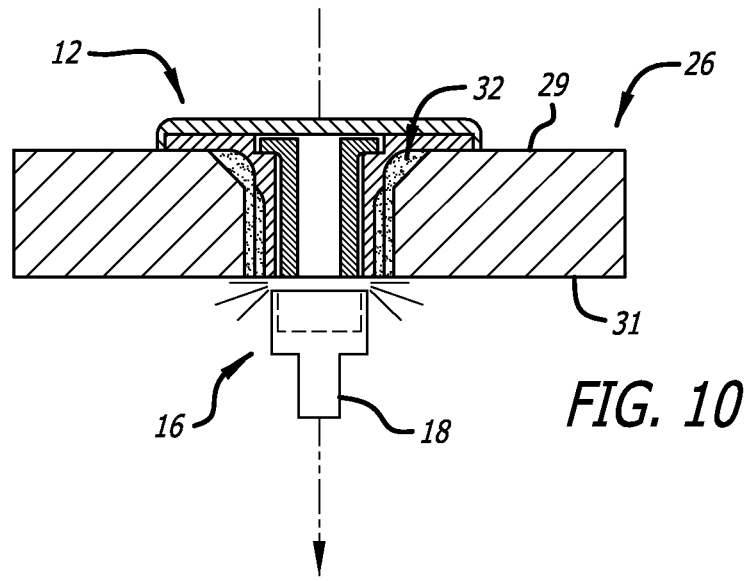
FIG. 10 is a cross-sectional side view of the wide flange insert in place within the cored panel showing the final step in its anchoring process.
Figure 11:
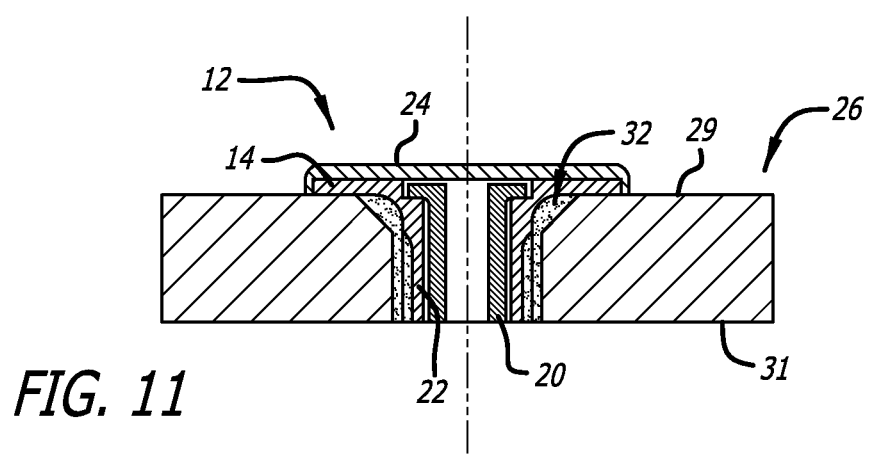
FIG. 11 is a cross-sectional side view of the wide flange insert in place within the prepared cored panel upon completion of the anchoring process.

As illustrated in FIG. 10, the sacrificial cover 16 and threaded pin 18 are then snapped or cut off, and the sandwich or composite panel 26 is dressed and cleaned for which a tool may or may not be used. FIG. 11 illustrates the final stage of the process wherein the counter sunk far side face sheet or load side is cleaned to remove any adhesive residue. Any sharp edges resulted from breaking apart the sacrificial cover are then dressed.

The wide flange insert configuration and method of installation of the present invention eliminates the need for large bonding cavities in the panel core, improves load distribution in the sandwich or composite panel, reduces the adhesive requirement, eliminates potential cold bridges, comprises a cleaner process, and significantly reduces manufacturing process times.

While a particular form of the invention has been illustrated and described, it will be apparent to those skilled in the art that various modifications can be made without departing from the spirit and scope of the invention. More particularly, the wide flange insert and bonding process is applicable to composite panels formed in a variety of dimensions and of a variety of materials and can be applied to a variety of aircraft interior structures including but not limited to galleys, seats, etc. Accordingly, it is not intended that the invention be limited except by the appended claims.

We claim:

1. An aircraft wall panel comprising:
    a rear fiberglass layer, a front fiberglass layer, and a honeycomb core layer between the rear fiberglass layer and the front fiberglass layer, wherein an aperture is formed through the rear fiberglass layer, the front fiberglass layer, and the honeycomb core layer;
    a layer of adhesive material applied within the aperture;
    a first annular member abutting the adhesive layer and comprising a flange adjacent the rear layer of the panel and a first annular shaft extending forwardly from the flange through the aperture to the front fiberglass layer;
    a second annular member comprising an enlarged end disposed proximate the flange and a second annular shaft extending along the interior of the first annular shaft, the second annular member adapted to receive a fastener such that the second annular member cooperates with the first annular member and the adhesive material to transfer a load to the panel; and
    a threaded apparatus to retain the first annular member and the second annular member during installation of the first annular member and the second annular member in the panel, the threaded apparatus comprising a threaded pin and a sacrificial cover,
    wherein the second annular member is sized to move radially within the first annular shaft to accommodate misalignment between the aperture and a component to be mounted to the panel.

2. The aircraft wall panel of claim 1, further comprising a cap attached to the flange, wherein the cap retains the second annular member within the first annular shaft.

3. The aircraft wall panel of claim 2, wherein the cap is releasably attached to a peripheral surface of the flange.

4. The aircraft wall panel of claim 1, wherein the enlarged end of the second annular member is larger than an interior diameter of the first annular shaft.

5. The aircraft wall panel of claim 1, wherein the first annular member is bonded to the panel by the adhesive material.

6. The aircraft wall panel of claim 5, wherein the adhesive material is cured.

7. The aircraft wall panel of claim 1, wherein the annular shaft of the first annular member or second annular member is tubular.

8. The aircraft wall panel of claim 1, wherein the flange abuts the rear layer of the panel.

9. The aircraft wall panel of claim 1, wherein the annular shaft of the second annular member is threaded internally.

10. The aircraft wall panel of claim 1, wherein the adhesive is a thermosetting adhesive.

11. The aircraft wall panel of claim 1, wherein the aperture is substantially filled with the adhesive material.

12. The aircraft wall panel of claim 1, wherein the threaded apparatus comprises a protective sleeve covering the threaded pin.

13. The aircraft wall panel of claim 1, wherein the threaded apparatus is pushed into the aperture and caused to pierce the front fiberglass layer.

14. An aircraft wall panel comprising:
    a rear fiberglass layer, a front fiberglass layer, and a honeycomb core layer between the rear fiberglass layer and the front fiberglass layer, wherein an aperture is formed through the rear fiberglass layer, the front fiberglass layer, and the honeycomb core layer;
    a layer of adhesive material applied within the aperture;
    a first annular member abutting the adhesive layer and comprising a flange adjacent the rear layer of the panel and a first annular shaft extending forwardly from the flange through the aperture to the front fiberglass layer;
    a second annular member comprising an enlarged end disposed proximate the flange and a second annular shaft extending along the interior of the first annular shaft, the second annular member adapted to receive a fastener such that the second annular member cooperates with the first annular member and the adhesive material to transfer a load to the panel; and
    a threaded apparatus to retain the first annular member and the second annular member during installation of the first annular member and the second annular member in the panel, the threaded apparatus comprising a threaded pin and a sacrificial cover, wherein
    the enlarged end of the second annular member is larger than an interior diameter of the first annular shaft, and
    the first annular member is bonded to the panel by the adhesive material.

15. The aircraft wall panel of claim 14, wherein the second annular member is sized to move radially within the first annular shaft to accommodate misalignment between the aperture and a component to be mounted to the panel.

16. The aircraft wall panel of claim 14, wherein the flange abuts the rear layer of the panel.

17. The aircraft wall panel of claim 14, wherein the annular shaft of the second annular member is threaded internally.

18. The aircraft wall panel of claim 14, further comprising a cap attached to the flange, wherein the cap retains the second annular member within the first annular shaft.

\* \* \* \* \*